(12) United States Patent
Currans et al.

(10) Patent No.: US 6,727,930 B2
(45) Date of Patent: Apr. 27, 2004

(54) PERSONAL DIGITAL ASSISTANT WITH STREAMING INFORMATION DISPLAY

(75) Inventors: Kevin G. Currans, Philomath, OR (US); John A. Bertani, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 568 days.

(21) Appl. No.: 09/861,108

(22) Filed: May 18, 2001

(65) Prior Publication Data

US 2002/0171691 A1 Nov. 21, 2002

(51) Int. Cl.[7] .................................................. G06F 3/14
(52) U.S. Cl. ....................... 345/864; 345/745; 345/744; 345/747; 345/854
(58) Field of Search ................... 345/864, 745, 345/744, 747, 854, 774; 715/501.1; 709/219, 203; 705/14

(56) References Cited

U.S. PATENT DOCUMENTS

| | | | |
|---|---|---|---|
| 5,579,472 A | 11/1996 | Keyworth, II et al. ...... 395/326 |
| 5,689,642 A | 11/1997 | Harkins et al. ......... 395/200.04 |
| 5,761,662 A | 6/1998 | Dasan ......................... 707/10 |
| 6,044,205 A | 3/2000 | Reed et al. ............. 395/200.31 |
| 6,057,840 A | * 5/2000 | Durrani et al. .............. 345/786 |
| 6,144,991 A | 11/2000 | England ...................... 709/205 |
| 6,151,621 A | 11/2000 | Colyer et al. ............... 709/204 |
| 6,161,149 A | 12/2000 | Achacoso et al. ............. 710/4 |
| 6,205,478 B1 | 3/2001 | Sugano et al. .............. 709/223 |
| 6,226,670 B1 | 5/2001 | Ueno et al. ................. 709/207 |
| 6,260,124 B1 | 7/2001 | Crockett et al. ............ 711/162 |
| 6,317,777 B1 | 11/2001 | Skarbo et al. .............. 709/204 |
| 6,336,134 B1 | 1/2002 | Varma ........................ 709/205 |
| 6,338,086 B1 | 1/2002 | Curtis et al. ................ 709/218 |
| 6,385,591 B1 | * 5/2002 | Mankoff ....................... 705/14 |
| 6,636,247 B1 | * 10/2003 | Hamzy et al. .............. 345/808 |
| 6,677,964 B1 | * 1/2004 | Nason et al. ............... 345/764 |

OTHER PUBLICATIONS

S. Dharap et al., "Multi–user distributed specification environments for Z," Technical report, Pennsylvania State University (1992), pp. 1–29.

S. Dharap et al., "The Z–Specificator: A multi–user distributed specification environment," Technical report, Pennsylvania Stazte University (1992), pp. 1–26.

S. Dharap, "Coordinating concurrent Development in Distributed Environments," Ph.D. thesis, Pennsylvania State University Department of Computer Science (May, 1995), pp. 1–98.

Welcome to Inetprogramming WorldWide Broadcasting [online] Available: http://inetprogramming.com/ [11/09/200].

* cited by examiner

Primary Examiner—Raymond J. Bayerl
Assistant Examiner—Thomas T. Nguyen

(57) ABSTRACT

A personal digital assistant can display large amounts of information as well as advertising by scrolling information and advertising in a ticker-tape format scrolled or rotated across a limited portion of the screen. Soft keys or other input mechanisms can be used to toggle the solicitation and display of additional advertising information if necessary. Large amounts of information, or local information of interest to a PDA user can be sent in real time or hot linked into the PDA for consumption by the PDA user at a later time.

10 Claims, 5 Drawing Sheets

PERSONAL DIGITAL ASSISTANT WITH STREAMING INFORMATION DISPLAY

Reference is made to U.S. patent application Ser. No. 2002/0174205 "Method and Apparatus To Deliver Personalized Travel Data", to Susan Nakashima, filed on the same day herewith, assigned to the same assignee, and which may contain related information.

BACKGROUND OF THE INVENTION

Personal digital assistants (PDA's) are well known. These small, hand-held computer systems perform many of the functions that paper calendars and paper notepads used to provide, but PDAs add additional capabilities and functionality that notepads, notebooks, and calendars were unable to provide, including, but not limited to, instantaneous retrieval and display of stored information.

A PDA is typically comprised of a microprocessor or microcontroller (i.e., a small, processor that executes a program of stored instructions) coupled to a liquid crystal display (LCD) screen or display on which symbols, text or icons are displayed and, into which signals can be input and detected thereby providing a two way communications capability by which information can be stored in an retrieved from memory that is part of the personal digital assistant computer. By way of example, most PDA's have electronic clocks and calendars by which a user can keep track of scheduled events or appointments, descriptions and/or dates or other information related to which, is entered into the PDA by means of character recognition software that reads signals that are input to the PDA through a pen or stylus contacting the screen or other touch sensitive input area of the PDA device. By an appropriate input signal to either a button, a soft key, or a particular key stroke entered into the PDA input screen, information that was previously entered or which might have been calculated by the microprocessor, can be retrieved for display by the user.

Information can also be downloaded into a PDA by way of a connection or coupling link between the PDA and a personal computer. Such a link is sometimes referred to as a Hot Sync® or "hot link" and might be realized by an infrared signals between the PC and PDA or a hard-wired connection. Information can be sent from a PDA into a PC using the same process. The process of loading data into a PDA or reading information from a PDA is frequently referred to as "hot linking" the PDA such that information in one machine is transferred into and synchronized with information in the other machine.

While PDA's might be very useful to record user-specified or user-supplied information, computational capabilities of a PDA lends itself to providing even more functionality to these devices. Inasmuch as PDA's are becoming more and more commonplace, they provide a mechanism by which additional functionality can be provided to users, which might provide even more tangible benefits than heretofore realized. Depending upon the nature of circuitry added to a PDA, still other uses might become commonplace. One use to which a PDA might be put is the display of information and data from third-parties, or the Internet. A method and apparatus by which a personal digital assistant might provide streaming information to a user might provide even more benefits than heretofore realized.

SUMMARY OF THE INVENTION

There is described a personal digital assistant comprised of a display and input interface device that displays in a limited region thereof, and analogous to a ticker tape-format display, a stream of information, preferably collected and supplied to the PDA user by third party service providers but also possibly provided by virtually any information source.

Such a personal digital assistant preferably includes a communication interface (e.g., a wireless link; infrared link to a P.C., or a direct connection) by which information-bearing signals are received from an information service provider for display on the PDA display device. Paid advertising can be inserted into the stream of information to be displayed.

DETAILED DESCRIPTION OF THE PREFERRED EMBODIMENTS

Figure 1:
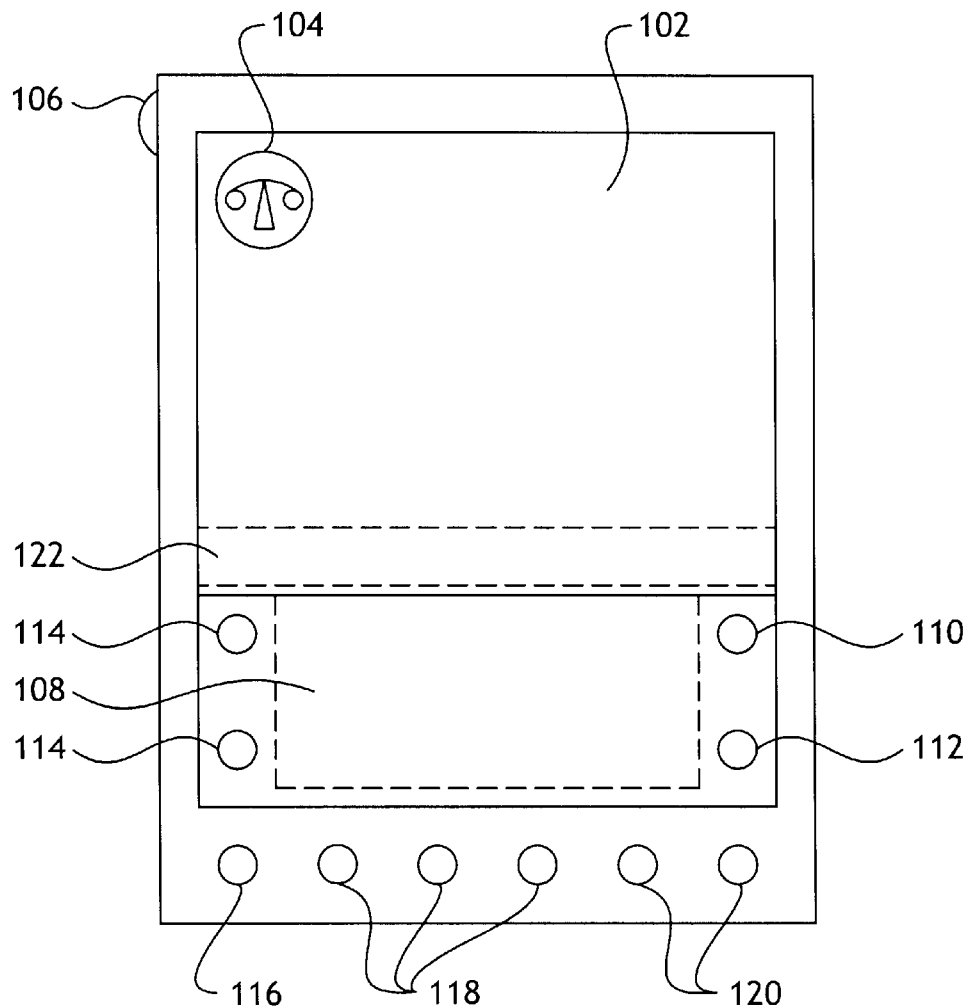
FIG. 1 shows a simplified representation of a personal digital assistant or "PDA" showing the typical form factor for the PDA, including a touch-sensitive LCD screen on which text and icons are made visible and on which a user's key strokes can be made and recognized by the PDA as "input."

FIG. 1 depicts a simplified representation of a personal digital assistant or PDA 100. These battery-powered devices typically include a liquid crystal display screen 102 that serves as both an output display device (on which information is displayed for the PDA user) and an input device into which signals or information from the user are input into and/or read or accepted by the PDA for processing and/or storage. Symbol recognition software within the PDA detects and "reads" the movement of a stylus on a touch-sensitive screen and transforms the stylus' movements into text or symbols or other key stroke actions. With practice, the touch-sensitive screen and stylus can function like the keyboard of a personal computer, which can itself function as a personal digital assistant. For purposes of claim construction, the term PDA or personal digital assistant and laptops or personal computers are considered to be equivalent devices and interchangeable.

Some PDAs display icons on the PDA screen 102 and used as a shorthand method by which embedded functions of the PDA can be invoked. By way of example, an icon of a telephone might invoke the storage or retrieval of telephone numbers when the telephone icon is "selected" by the user.

A pen-like device, referred to herein as a "stylus" 106 (typically stored within the PDA housing) is used to provide input signals to the PDA via a touch sensitive region 108 on the LCD screen 102 and also to toggle touch sensitive icons 104, 110, 112, 114, and 116 displayed on pre-determined locations of the screen 102, as well as trigger mechanical switches 116, 118, and 120. The stylus 106 is typically a small, plastic shaft or rod having a tip or point, the tip or point of which is small enough to selectively touch small-area icons on the screen.

Additional functionality and benefits of a PDA are realized by augmenting a PDA with the ability to display large amounts of data or information on the small-area screen 102. In the preferred embodiment, information is displayed on the screen 102 in one or more screen regions in which information appears in streams, analogous to a so-called ticker tape, that is scrolled across the screen in a limited portion thereof, perhaps one or more individual "lines" of the screen. In appropriately -equipped PDAs, (equipped with an appropriate wireless communications capability) information can be displayed continuously, on a real time, or nearly real-time basis.

Given the fact that the PDA display screen 102 is of limited size, which is required for the PDA to be "portable," the preferred method for displaying large amounts of information on a personal digital assistant display device (which, for claim construction purposes, is hereafter considered to be a display and input device) is to format information to be displayed on the PDA screen, into a ticker-tape type display. By scrolling information one, window at a time, or repeating a portion of the text that is scrolled, large amounts of information can be scrolled across the PDA display and input device or screen 102.

In the preferred embedment, as shown in FIG. 1, one or more individual lines or regions 122 of the PDA display and input device 102, can be set aside for the exclusive display of streams of information that might be provided to the PDA 100 from an external information service provider. This dedicated, predetermined region of the display and input device 102 can be arranged either horizontally or vertically such that information (text, icons, or other symbols or mnemonics) can be continuously or repetitively scrolled across the screen, (left to right, or, right to left) perhaps at a user-specified rate and format, to display on the PDA virtually any amount of information.

In one embodiment, information can be scrolled onto the screen to fill the display area. The information can be left for a predetermined time, then replaced by successive text. Alternatively, information might scroll continuously, or, be displayed and left on the screen until the PDA user toggles the next window of information using the stylus.

As shown in FIG. 1, a one (or more) line display region or area 122 is set aside or allocated for displaying streaming information, which in the preferred embodiment is information provided by the Hewlett-Packard Instant Delivery™ (HPID) service. (When not displaying an information stream, the one-line display region 122 can be used for other display purposes.) HPID is an information collection service that searches for and collects information from a variety of Internet (i.e. the world wide web) sources (such as newspapers, periodicals or electronic media). HPID preferably collects only certain types of information that comports with user-specified criteria or specifications, which are typically retained in an HPID subscriber preference file. By way of example, a subscriber can specify the retrieval of information or news related to particular topics of interest to the subscriber. Conversely, advertisers can place ads to individuals with certain interests or particular demographic characteristics.

While HPID selectively collects information of interest from newspapers and other on-line publications, and also prepares such information for printing on a user's printer, alternate embodiments of the invention would certainly include displaying an entire issue of a publication, or merely headlines thereof, additional data such as transportation schedules, fares and fare discount information, weather forecasts and related climate data, local lake or river levels, or individual stock quotes available from one or more exchanges can also be displayed. For claim construction purposes, data or information that is collected from any source by an information collection service provider, for direct or indirect delivery to and display on a PDA, are considered to be equivalents. By using a third party information service provider, such as HPID information and/or data that is sent to, or to be displayed on the PDA, can be limited to subject matter of interest to the PDA user— perhaps avoiding overwhelming the PDA as well as the user with unwanted data.

The orientation of the PDA's information display line on the screen 102, as well as the position, size, resolution, scroll direction, or the repetition of certain information streams can all be readily controlled by appropriately programming or enabling PDA software, as well as providing the appropriately capable hardware. Soft keys 114, 110, or 112, or perhaps the electrical switch contacts 116, 118, and 120 on the PDA can be used to toggle or control information display provided by the PDA.

Figure 2:
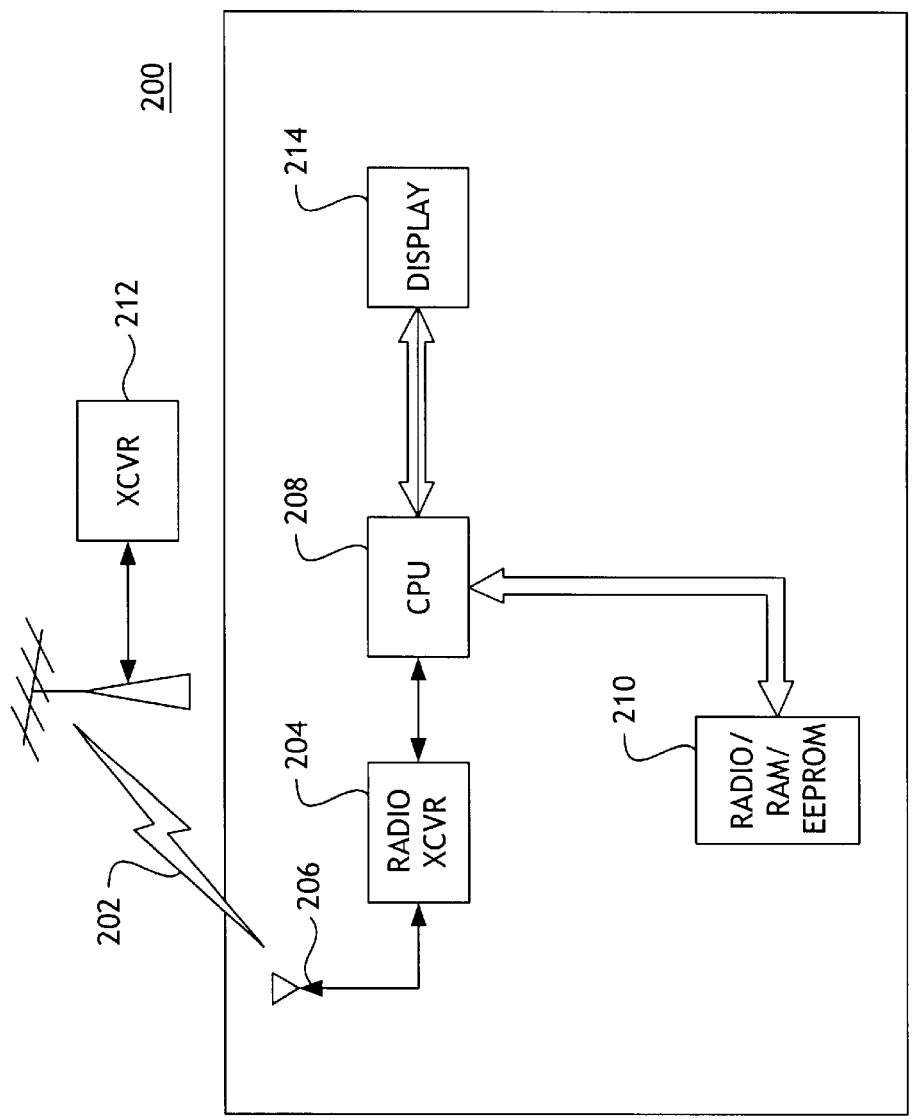
FIG. 2 shows a simplified block diagram of the functional elements of a personal digital assistant by which an information stream from an information service provider can be displayed on the PDA.

FIG. 2 shows a simplified block diagram of the functional components of a preferred embodiment of a PDA 200 by which information can be transferred to and from the PDA 200 via signals sent over a wireless link 202. By using a wireless data link, real-time information updates can be continuously delivered to the PDA 200, thus providing a truly portable, and possibly bi-directional information link to the PDA user through which only pertinent information would be delivered. For purposes of claim construction, equivalents to a wireless radio link include an infrared data link provided by an infrared transmitter and receiver and a direct, i.e. hard-wired network connection, such as that provided by an Ethernet network connection or even a dial-up modem connection, which are communication interface devices and methodologies known to those skilled in the art.

In FIG. 2, the PDA 200 is shown to include a two way radio transceiver 204 such as a cellular telephone (or PCS)-type transceiver but also possibly including a two way paging device by which data modulated onto an RF carrier and received in an antenna 206 is demodulated and recovered for recognition and processing by a microprocessor or micro controller 208. (Cellular, paging, PCS (personal communications systems technology and equivalents thereof, are known to those skilled in the art.) Functionality and programmability of the processor 208 is in part provided by computer program instructions and data stored in memory 210 which could include read only memory, random access memory, or electrically erasable programmable read only memory, as those skilled in the art will recognize.

For purposes of claim construction, information that is received from a third party information service provider (216) via the radio link 202 and recovered from the radio signal for display on the PDA is considered herein to be a stream of information, whether its length is only a few bytes or several million thereof. In the preferred embodiment, the information stream is obtained from the HPID service and sent to a radio transmitter 212 for broadcast to a remotely located wireless personal digital assistant communications device 200.

Information recovered from the radio signal 202 is appropriately processed by the computer 208 for display on the display and interface unit 214. In the preferred embodiment, HPID pre-selects information of interest to an HPID service subscriber and only sends information meeting certain criteria. In an alternate embodiment, an information stream might include unfiltered information that is broadcast to all PDA users such that the processors of the PDAs perform a filtration function, locally selecting certain information in the stream for display on the screen 102. A user-preference file stored in the PDA memory 210 can hold criteria by which unfiltered information in a broadcast can be locally selected (in the PDA) for display. The filtration of raw information received in the PDA 200 can be performed by the processor 208 if user criteria or specification are stored locally in the memory 210 (or otherwise made available locally) and if PDA processor software is written to filter for display, only information matching certain predetermined criteria.

As noted in FIG. 2, each of the information and data flows is bi-directional. Radio signals received at the transceiver 204 and processed by the computer 208 are sent to the display unit 214, however, the display unit 214 is also capable of receiving input signals from a user creating a flow of information in the opposite direction, i.e. to the CPU for subsequent processing. As an example, a user may request additional information via the input signals to the display unit 214 which would cause the CPU 208 to send an appropriate command to the transceiver 204 which would broadcast a response signal 202 to an information service provider 212 requesting additional information.

Figure 3:
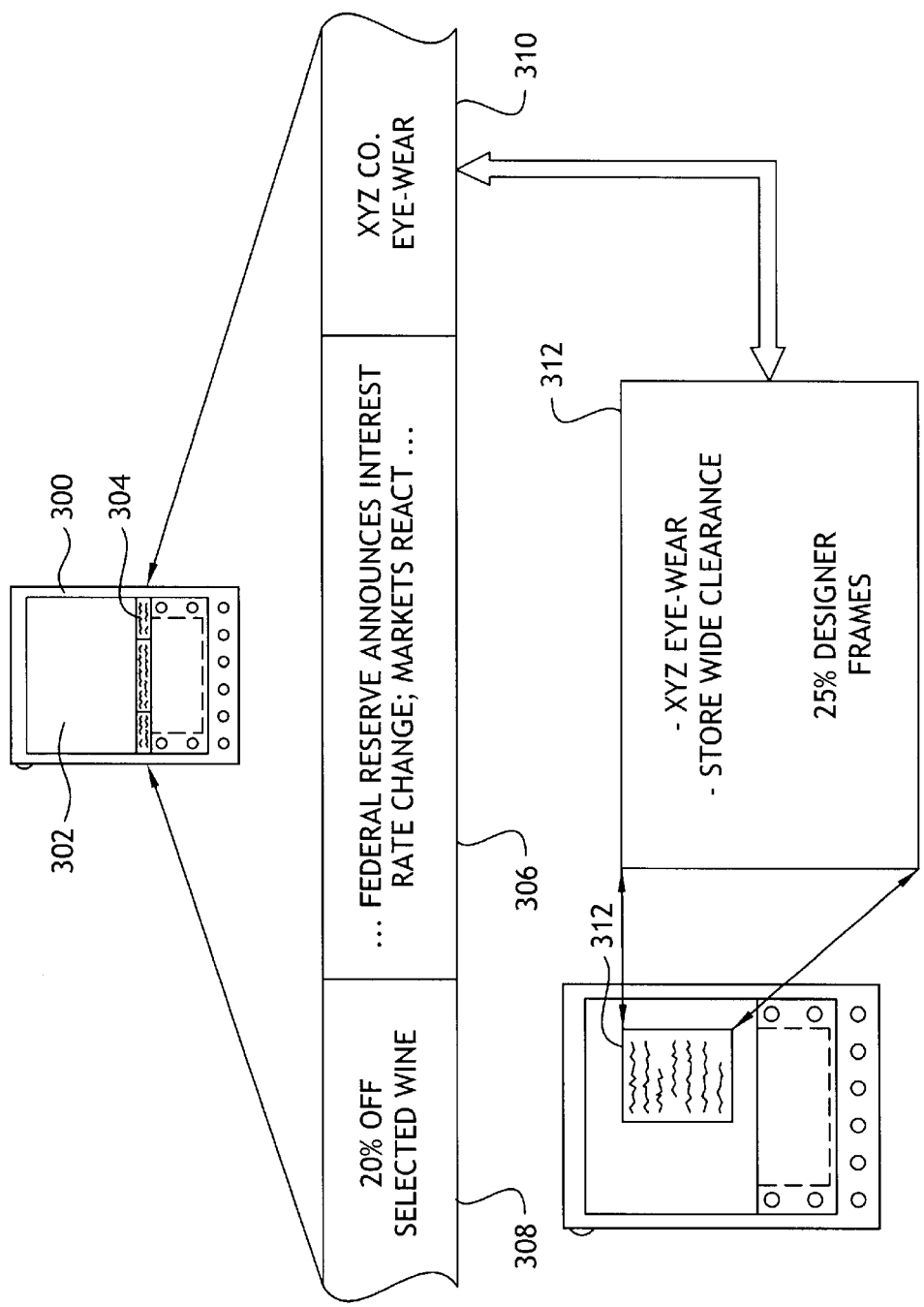
FIG. 3 shows an exemplary display of an information stream with embedded advertisements and how it might appear on a personal digital assistant display device.

FIG. 3 shows a simplified depiction of how scrolling or ticker-tape display of information might be made to appear on a limited screen area such as that commonly found on commercially available personal digital assistants.

With respect to FIG. 3, a PDA 300 having a liquid crystal display input device and display device 302 has one or more display lines 304 allocated to a predetermined region of the display unit 302. Upon closer examination, the information displayed in the predetermined region of the screen 304 includes a stream of financial news or other information or data 306 which might be obtained via the HPID service, or from other information service providers. If such information is appropriately formatted, it can provide to the PDA user large amounts of information of particular interest to the PDA user. The information displayed on the screen display lines 304 can be held in position for some pre-determined or a user-specified length of time allowing the PDA user time to read each "frame." Alternatively, information might be continuously scrolled, at various rates, thereby assuring that all of the information to be displayed is scrolled. Still other embodiments would include holding a display window content until the PDA user toggles a screen re-write, by way of a key stroke or key depression for example. For purposes of claim construction however, all of the foregoing techniques or methods are considered to be equivalent ways of "displaying" information, regardless of how such information was obtained by the PDA.

As an embellishment to the real time display of selected information in a PDA, commercial advertising information might be embedded into the information stream. By providing the ability to insert advertising information into an information stream, the provision of a wireless data service such as HP ID or other on line data service might be indirectly subsidized by advertisers who pay for the ability to advertise products or services along side or embedded with information embedded in the HP ID or other information stream. By way of example, in FIG. 3, commercial entities might purchase advertising space 308 and 310 that would be scrolled along side the informational content messages 306. As an additional embellishment, if a user wished to have more information on an advertised product, such as the eyewear advertised 310, by an input signal provided to the display device 302, additional information that was embedded in the recovered information stream broadcast to the PDA 202 could be immediately displayed on the screen as the advertisement copy 312 shown in FIG. 3. The provision of such advertising content is also considered to be a "display" of information on the PDA screen.

As an alternate embodiment, selecting the advertising copy 310 by an appropriate input perhaps from the pen or stylus 106, a two way transmission capability in the PDA 200 would allow a hyper link data exchange to take place such that a broadcast signal returned to the information service provider could trigger the download of additional information, such as the advertisement 312 depicted in FIG. 3. By providing the ability to request additional information remotely, the volume of downloaded data might be less than that required to send additional or secondary information streams. For purposes of claim construction, the selection of an ad in a stream of information, which is considered to be a primary or first information stream might trigger the display of additional information considered to be a secondary or second data stream by which additional advertising information might be conveyed to the PDA user.

Figure 4:
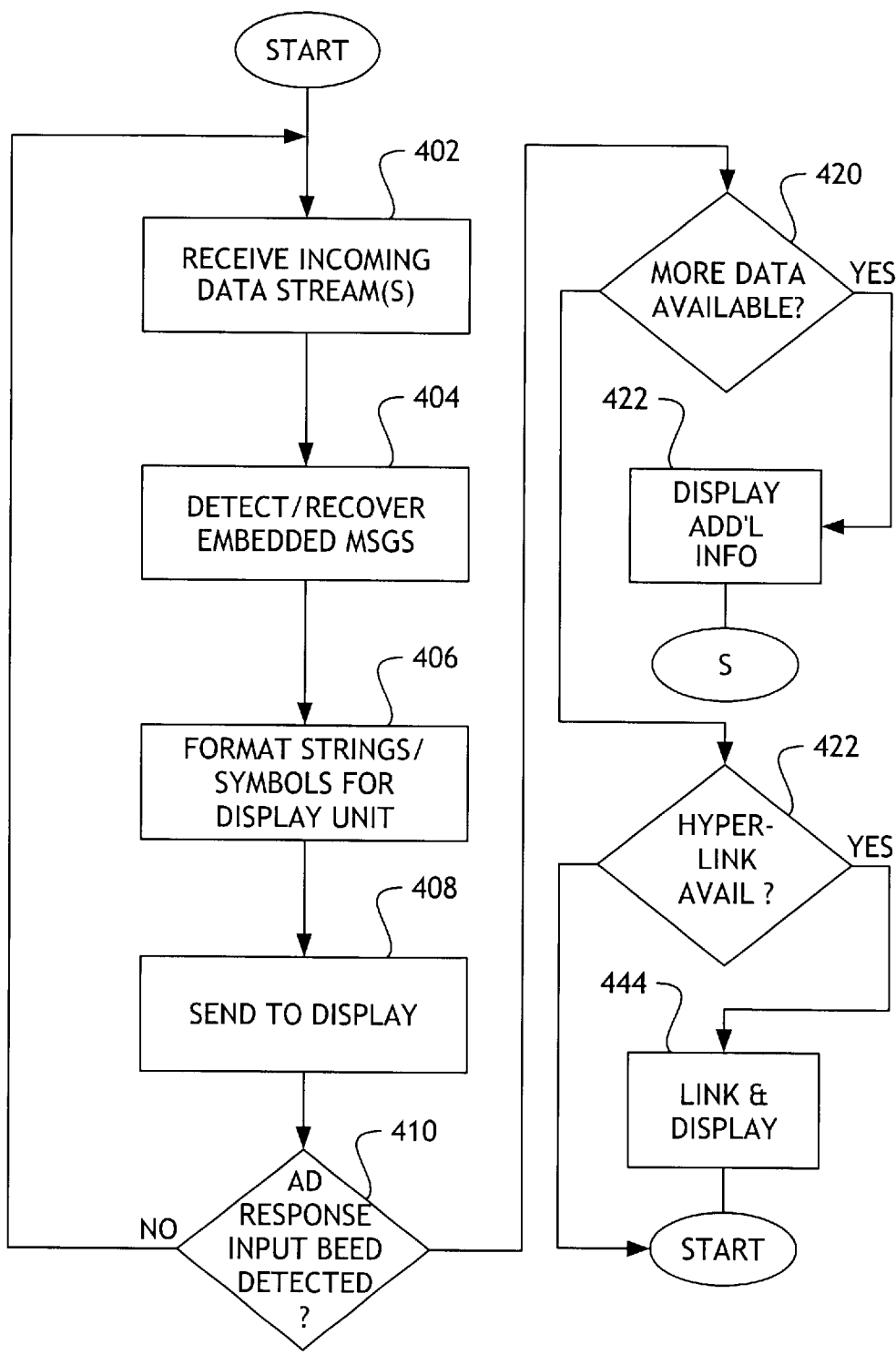
FIG. 4 is a flow chart depicting an exemplary process by which an information stream that includes embedded advertising messages would be received and processed for display on a PDA.

FIG. 4 depicts a simplified flow chart of the steps of a method by which an information stream might be collected and/or provided to a personal digital assistant for display on its display and input stream. In the preferred embodiment, a third-party collects information from a variety of sources and preferably filters out unwanted information and formats the information for display on a PDA. Information filtration (according to a subscriber profile for instance) is performed by a service such as HPID.

In FIG. 4, an incoming data stream is received at the PDA 402, which in the preferred embodiment is an RF signal onto which data is modulated for recovery within the PDA. Alternate embodiments of the invention however would include recovering data via hot linking the PDA to a personal computer or perhaps coupling the PDA to an information source via a phone line or other type of direct data link, all of which are considered to be equivalent.

After a data stream has the information recovered there from in step 404, by well-known RF demodulation and data recovery techniques, the information must be formatted for display on a limited size screen area. Because the PDA display screen is relatively small, a scrolling or streaming type display, analogous to a ticker tape information display, readily lends itself to use with a personal digital assistant display unit. Formatting the information recovered from the data stream 406 necessarily requires that the symbols, icons or other characters of an information stream be formatted for display onto a personal digital assistant. In some embodiments, one or more lines of an LCD display on a PDA might scroll continuously. Alternate embodiments might have a signal line of the display momentarily stopped until a user toggles the display of the next line. Alternate (and equivalent) embodiments might pause the information update so that information scrolls across the display area 122 until it is filled, hold the displayed information for a set period of time, then update the displayed information by scrolling new information into the display area 122 (scrolling line display area). The display can of course scroll horizontally, vertically, diagonally, as a design choice.

After the data is appropriately formatted, it is transferred to (coupled into) the display unit for actual display to the user 408. In the case of embedded advertising, the PDA program control might wait for a response from the user in step 410, allowing an advertiser an opportunity to supplement a displayed ad by a hot link to a web site or the display of more information that might have been sent in the information stream, held in the PDA memory 210 but not displayed on screen 122 unless the PDA user requests it.

If no response is received in response to a displayed advertisement, such as those shown in FIG. 3, program control would typically return to statement 402 to continue receiving other incoming data streams or processing undisplayed information. If a response to an advertisement, such as those shown in FIG. 3 were received, program control would transfer to step 420 to determine whether more data is locally available in the PDA in which case it would be displayed in step 422. Alternatively, a hyper link to a web site or a request for a download of additional information from the information service provider takes place in step 422 with the subsequent display of that information in step 424 if it is available. At the conclusion of the determination of whether or not information is available, program control would return to the starting point of the process depicted in FIG. 4.

Figure 5:
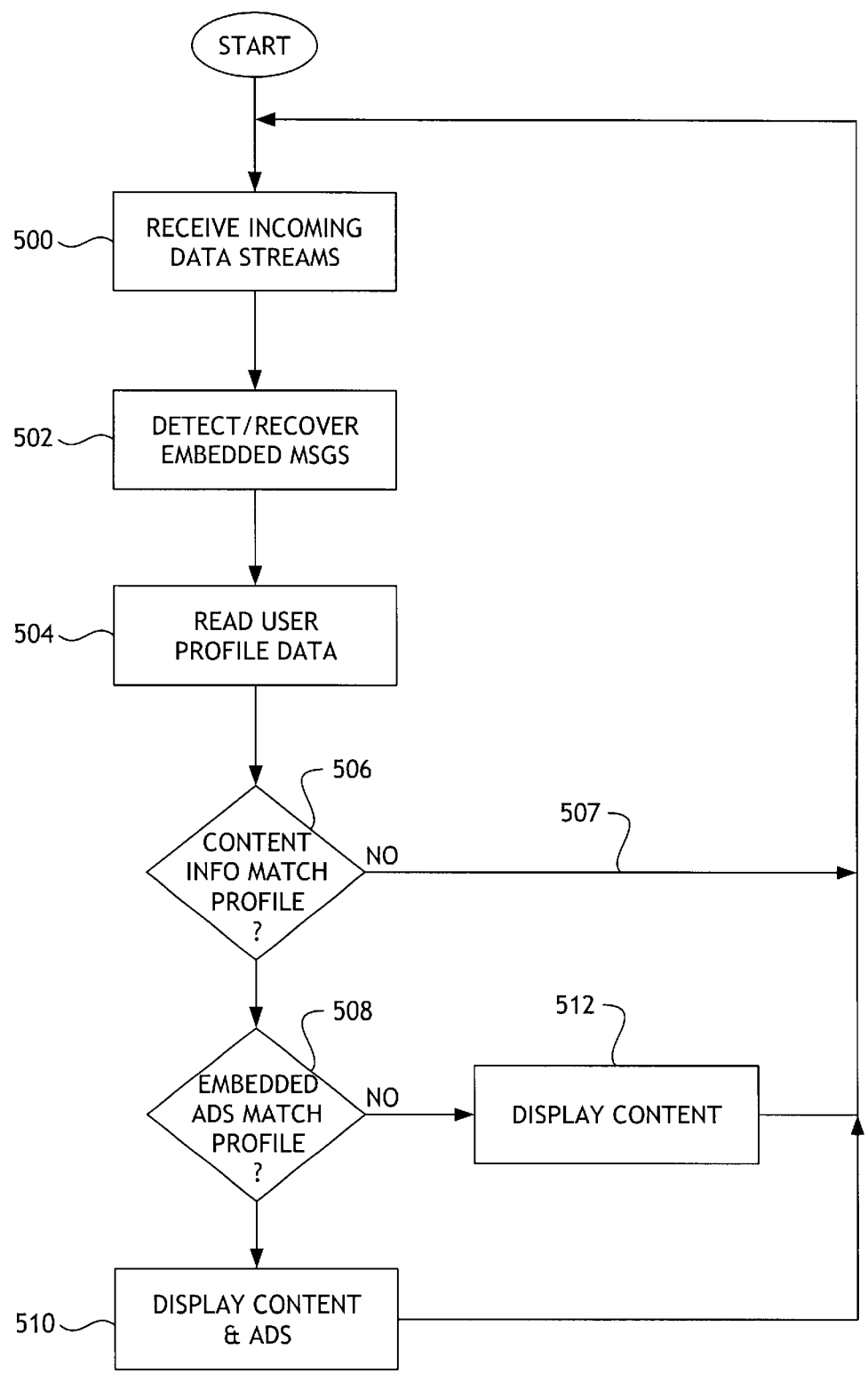
FIG. 5 shows another flow chart of a process by which information from an information service provider might be correlated with data stored locally within the PDA so as to display only information of interest to the PDA user.

In FIG. 5, the reception of incoming data streams 500 followed by the detection of embedded messages and advertising text if any, is followed by the determination of whether or not user profile data is locally resident within the PDA 504. As an alternate embodiment, broadcast information by an information service provider 504 might be selectively displayed by the PDA if the PDA is programmed to filter information for display according to user-defined criteria or other data. A user profile might include certain key words, topics or other recognizable criteria to identify subject matter in an information stream of interest to the PDA user. Upon the determination that broadcast information that was received by the PDA matches a user profile in step 506, a decision is made whether to display received contents that matches the user profile. If no information that was received matches the profile, nothing is displayed in step 507. If content information received by the PDA does match a user profile, which would typically be stored in RAM or ROM 210, a second test in step 508 would include the determination of whether embedded advertising information that was received at the PDA also matches the user profile. A determination that embedded advertisements, such as ads 308 and 310 match a user profile, would be followed by the display of those ads 510 on the display unit of the PDA. If the determination that no ads in the information stream matched the profile the display of advertising could be suppressed in step 512 with program control returning to the top of the program loop as shown.

By providing either a two way or one way radio link, or a wireless infrared data link or other communications interface to a personal digital assistant, it is possible to provide to the PDA user a virtually real time information stream. By appropriately calling information of interest to the PDA user it is possible to provide ongoing real time information of interest and possible to embed in that information, advertising messages generating revenue to subsidize all or part of the PDA service.

In addition to sending information such as that collected by the HPID service or its equivalents, other information such as commercial airline flight arrival times, delays, changes and other relevant information can also be sent to the PDA for display. Quotations of publicly traded securities and equities can be continuously broadcast to the PDA and displayed in a limited region of the screen. By using two-way paging, cellular or PCS communications services, two-way communications allow the ability to purchase or sell stocks and equities. Weather forecasts and related climate data could be broadcast to and received by the PDA as well as telephone numbers or e-mail messages, including access to the Internet using any part of the screen 102 as a display and input device. In addition to displaying any sort of data that might be sent to the PDA, local PDA data or information, such as time, date, schedules and appointments, location (regardless of how location might be determined such as GPS, triangulation or Blue-Tooth data network signals) that might already be contained within the PDA or provided thereto, can also be displayed on any part of the screen 102 or the scrolling line display area 122.

In addition to all of the foregoing, by providing an appropriate interface to the PDA, information that is scrolled or streamed in the display unit of the PDA could be also of course printed on an appropriate device linked to the PDA through any appropriate protocol. A printer interface on the PDA would allow the PDA to drive a printer directly. Alternate embodiments would allow the PDA to upload data to a PC, through a hot link for instance, so that the PC could perform the printing operation.

From the perspective of information service providers and advertisers, the PDA and the foregoing method by which large amounts of information interleaved with commercial advertising, might provide a significant business opportunity. An information service provider would typically accumulate subject matter, preferably of interest to a particular user, for broadcast or distribution through a wireless radio link, the Internet, or perhaps a telephone network. Once such information is collected, it is preferably formatted to expedite the display on a single line of a PDA display screen or other limited area thereof. Of course transmission in the form of a radio broadcast, but also in the form of an Internet distribution or a telephone download would enable the distribution of the information of interest to the various users.

By offering advertising space in the information stream, revenue might be generated for the information service provider at least partially or completely off setting the cost to provide such a service to users. In a two way or bi directional data link, the information service provider might receive responses to advertising copy allowing the information service provider and accordingly the advertiser to provide yet additional data in the form of a second information stream broadcast via a radio link or distributed via an Internet or other transmission media, preferably providing additional information of interest on a particular product or service to the PDA user.

What is claimed is:

1. A personal digital assistant (PDA) that displays information, comprising:

a receiver for receiving signals that carry stream information sent to the personal digital assistant (PDA) from an information service provider by a PDA communications device, and for coupling the stream information to the PDA;

a display and input device included within the PDA for displaying the stream information sent to the PDA in a confined and predetermined region of said display and input device included within the PDA; wherein the stream information delivered to the PDA is selected for delivery according to PDA-user criteria;

wherein the receiver additionally recovers from the signals, the first and second stream information to be displayed on the display and input device;

a processor for processing at least a portion of the first and second stream information so that the portion of the first and second stream information is scrolled in a confined region of a display device, the processing causing at least one different stream information to be displayed in response to a received user input;

wherein the first stream information displayed includes advertising information and content information, the first stream information being obtained from the Hewlett-Packard Instant Delivery service; and wherein the second stream information displayed is obtained via an Internet hyperlink and in response to an input signal from a user interacting with the display and input device of the PDA, the input signal being responsive to the first stream information displayed on the display device;

wherein the display device receives the user input in response to displayed information and scrolls the first and second stream information as ticker tapes in the confined and predetermined region of the display device; and a transmitter for transmitting a second signal from the PDA communications device in response to an input signal from the user of the PDA, the input signal from the user being responsive to the first stream information that is displayed on the display device.

2. The PDA of claim 1, wherein the display device scrolls at least one of the first and second stream information horizontally.

3. The PDA of claim 1, wherein the display device scrolls at least one of the first and second stream information vertically.

4. The PDA of claim 1, wherein the receiver receives the signals by way of one of the group consisting of: a radio link, an infrared link, and a wired network connection.

5. The PDA of claim 1 wherein at least one of the first and second stream information is selected from the group consisting of:

transportation schedules, fares and discount information;

publicly traded securities and equities;

Internet domain names and related stream of information obtained from Internet resources;

weather forecasts and related climate data;

published telephone numbers and e-mail addresses;

local time;

date;

schedules and appointments;

e-mail; and geographic location.

6. A method of displaying information on a personal digital assistant (PDA) comprising the steps of:

receiving signals that carry stream information sent to the personal digital assistant (PDA) from an information service provider by a PDA communications device;

displaying the stream information sent to the PDA on a display and input device included within the PDA, wherein the stream information delivered to the PDA is selected for delivery according to PDA-user criteria;

recovering from the signals, the first and second stream information to be displayed on the display and input device;

processing at least a portion of a first and a second stream information so that the portions of the first and second stream information are scrolled in a confined region of a display device, the processing step causing at least one different stream information to be displayed in response to a received user input;

wherein displaying the first stream information includes displaying advertising information and content information, the first stream information is obtained from the Hewlett-Packard Instant Delivery service; and wherein the second stream information is obtained via an Internet hyperlink and in response to an input signal from a user interacting with the display and input device of the PDA, the input signal being responsive to the first stream information displayed on the display device;

wherein the display device receives the user input in response to displayed information and scrolls the first and second stream information as ticker tapes in a confined and predetermined region of the display device; and transmitting a second signal from the PDA communications device in response to an input signal from the user of the PDA, the input signal from the user being responsive to the first stream information that is displayed on the display device.

7. The method of claim 6, wherein the displaying on a display and input device step includes at least one of the first and second stream information scrolling horizontally.

8. The method of claim 6, wherein the displaying on display and input device step includes at least one of the first and second stream information scrolling vertically.

9. The method of claim 6, wherein the receiving step includes receiving the signals by way of one of the group consisting of: a radio link, an infrared link, and a wired network connection.

10. The method of claim 6, wherein at least one of the first and second stream information is selected from the group consisting of:

transportation schedules, fares and discount information;

publicly traded securities and equities;

Internet domain names and related stream of information obtained from Internet resources;

weather forecasts and related climate data;

published telephone numbers and e-mail addresses;

local time;

date;

schedules and appointments;

e-mail; and geographic location.

* * * * *